(12) United States Patent
Pinson et al.

(10) Patent No.: US 7,873,662 B2
(45) Date of Patent: Jan. 18, 2011

(54) LINK BETWEEN A CENTRAL SYSTEM AND A SATELLITE SYSTEM FOR EXECUTING OPERATIONS OF THE CENTRAL SYSTEM

(75) Inventors: Denis Pinson, Goupillieres (FR);
Patrick Sala, Porcheville (FR);
Jean-Paul Pigache, Villepreux (FR)

(73) Assignee: Bull, S.A., Louveciennes (FR)

( * ) Notice: Subject to any disclaimer, the term of this patent is extended or adjusted under 35 U.S.C. 154(b) by 2527 days.

(21) Appl. No.: 10/088,224

(22) PCT Filed: Jan. 18, 2001

(86) PCT No.: PCT/FR01/00148

§ 371 (c)(1),
(2), (4) Date: Mar. 19, 2002

(87) PCT Pub. No.: WO02/07409

PCT Pub. Date: Jan. 24, 2002

(65) Prior Publication Data

US 2002/0137456 A1      Sep. 26, 2002

(30) Foreign Application Priority Data

Jul. 19, 2000   (EP) .................................. 00402056

(51) Int. Cl.
*G06F 7/00* (2006.01)
*G06F 17/30* (2006.01)

(52) U.S. Cl. .................... 707/791; 709/208; 709/217

(58) Field of Classification Search .................. 709/208, 709/217
See application file for complete search history.

(56) References Cited

U.S. PATENT DOCUMENTS

| | | | | |
|---|---|---|---|---|
| 4,266,271 A * | 5/1981 | Chamoff et al. | ............. | 709/209 |
| 4,468,750 A * | 8/1984 | Chamoff et al. | ............. | 709/251 |
| 5,239,543 A * | 8/1993 | Janssens | ..................... | 370/458 |
| 5,313,664 A * | 5/1994 | Sugiyama et al. | ............. | 705/21 |
| 5,801,659 A * | 9/1998 | Helfrick | ................. | 342/357.08 |
| 5,818,825 A * | 10/1998 | Corrigan et al. | ............. | 370/329 |
| 5,915,094 A * | 6/1999 | Kouloheris et al. | ......... | 709/219 |
| 6,249,771 B1 * | 6/2001 | Kurihara | ...................... | 705/26 |
| 6,466,554 B2 * | 10/2002 | Okada | ........................ | 370/312 |
| 6,601,128 B1 * | 7/2003 | Burton et al. | ............... | 710/316 |
| 6,625,625 B1 * | 9/2003 | Kihara et al. | ............... | 707/204 |
| 7,257,611 B1 * | 8/2007 | Shankar et al. | ............. | 709/201 |
| 2003/0202539 A1 * | 10/2003 | Fukunaga et al. | ........... | 370/489 |

* cited by examiner

*Primary Examiner*—Shew-Fen Lin
(74) *Attorney, Agent, or Firm*—Miles & Stockbridge P.C.

(57) ABSTRACT

In order to have operations of a central system executed by a satellite system, a linking structure is located between the central system and the satellite system. The linking structure includes: a communications link between the central system and satellite system; a control card, in the central system, that places said operations in one or more data blocks; and a coupler, in the satellite system, that sends through the link to the control card at least one read command to which the control card responds by sending said data block or blocks through the link to the coupler.

3 Claims, 6 Drawing Sheets

LINK BETWEEN A CENTRAL SYSTEM AND A SATELLITE SYSTEM FOR EXECUTING OPERATIONS OF THE CENTRAL SYSTEM

BACKGROUND OF THE INVENTION

1. Field of the Invention

The field of the invention is that of computer systems and more particularly concerns a central system from which one wishes to remote part of the execution of certain operations to a satellite system.

Remoting an execution is advantageous for example when the central system is a proprietary system. The operations of the proprietary system benefit from increased computing power and a high level of security and reliability. A satellite system from the so-called open world makes it possible to use standard hardware and software on the market.

2. Description of the Related Art

When a task is performed entirely in a single system, the execution of the operations is fast since it runs in command control mode in devices that react in slave mode. When the execution of a task is distributed among several different systems, the prior art normally proposes having the systems communicate by means of messages. There are known architectures of the client-server type. In assigning the client function to the central system and the server function to the satellite system, the central system will establish a connection with the satellite system and send a request message to the satellite system, which will return a response message. However, the fact that the messages pass through numerous communication layers does not result in comparable performance in terms of speed relative to operations executed entirely in the same system.

SUMMARY OF THE INVENTION

To eliminate the aforementioned drawbacks of the prior art, the subject of the invention is a protocol between a central system and a satellite system for having an operation of the central system executed by the satellite system. The protocol includes:

- a first step in which the satellite system sends a read command to the central system, identified by a first logical unit number;
- a second step in which the central system responds to said read command by sending at least one data block containing said operation;
- a third step concomitant with the second step, in which the satellite system receives said data block in order to process the operation it contains.

BRIEF DESCRIPTION OF THE DRAWINGS

Other advantages and details of the invention will emerge from the preferred exemplary embodiment described below in reference to the figures, in which.

DESCRIPTION OF THE PREFERRED EMBODIMENTS

Figure 1:
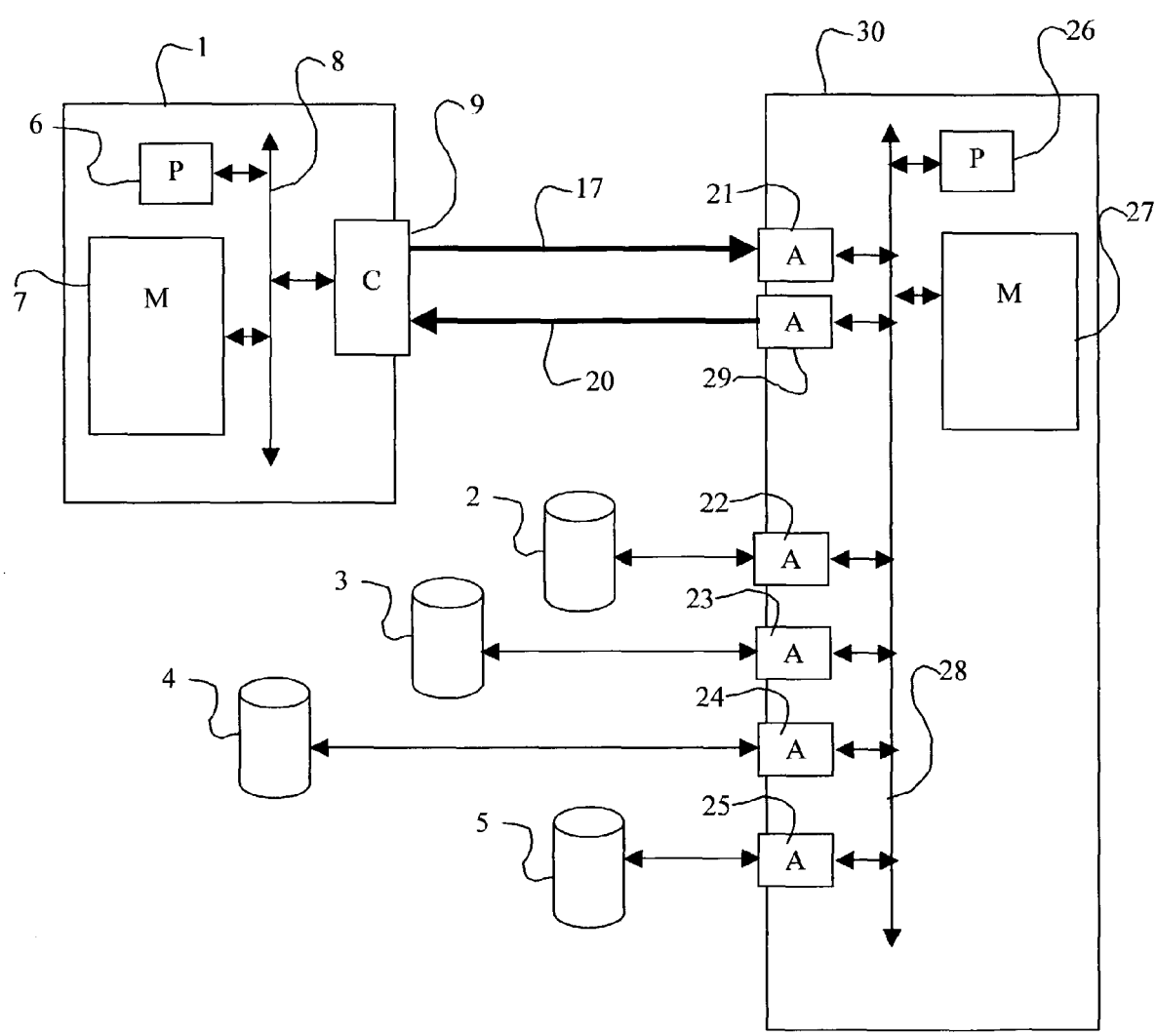
FIG. 1 presents a central system, a satellite system and peripheral systems.

Referring to FIG. 1, a central system 1 generally includes one or more processors 6 that access programs and data addressed in a random access memory 7 via a bus 8. In order to be able to process data outside the direct physical address space of the memory 7, the central system 1 performs operations for accessing peripheral subsystems 2, 3, 4, 5 comprising, for example, mass storage units such as disks and magnetic tapes.

Each peripheral subsystem 2, 3, 4, 5 is identified by a logical unit number LUN. In the central system 1, a control card 9 is connected to the bus 8 in order to send read and write commands and data corresponding to the write commands to the peripheral subsystems, and to receive data that comes from the peripheral subsystems in response to the read commands.

In order to perform an operation for accessing a peripheral subsystem, the central system 1 sends an interrupt to the control card 9. Upon receiving an interrupt, the control card 9 reads in memory 7 parameters that qualify the access operation, such as the type of operation, the logical unit number that identifies the peripheral subsystem to which the operation applies, and the addresses of the memory 7 reserved for the data of the operation.

If the operation is a write operation, the control card 9 generates a write command sent to the identified peripheral subsystem, followed by the data of the operation, which is read in memory 7. Upon receiving a return status of the peripheral subsystem indicating that the write command has been correctly executed, the control card 9 generates a signal in memory 7 to inform the central system 1 that the write operation is finished.

If the operation is a read operation, the control card 9 generates a read command sent to the identified peripheral subsystem. Upon receiving the read data returned by the peripheral subsystem, the control card 9 writes the data received into memory 7 and generates a signal to inform the central system 1 that the read operation is finished.

A satellite system 30 includes one or more processors 26 that access programs and data addressed in a random access memory 27 via a bus 28. In the satellite system 30, a coupler 22 provides a link with the subsystem 2, a coupler 23 provides a link with the subsystem 3, a coupler 24 provides a link with the subsystem 4, and a coupler 25 provides a link with the subsystem 5. The links provided by the couplers 22-25 are standard types such as SCSI (Small Computer System Interface) or Fiber Channel. Standard drivers, hosted in memory 27, control the couplers 22-25 via the bus 28 to which these couplers are connected.

The control card 9 is linked to the satellite system 30 by a so-called downlink 17 (D) and by a so-called uplink 20 (U). Each of the links 17 and 20 is embodied by a standard fast link such as "Ultra Wide SCSI" at 40 Mbps. A coupler 21 and a coupler 29 are connected to the bus 28 in the satellite system 30 so as to make the satellite system 30 the master in each of the links 17 and 20. Standard drivers, hosted in memory 27, control the couplers 21 and 29.

The control card 9 is declared to be in slave mode in each of the links 17 and 20. Thus, the satellite system 30 sends read commands through the link 17 via the coupler 21. The satellite system 30 sends write commands and blocks to be written through the link 20 via the coupler 29.

Figure 2:
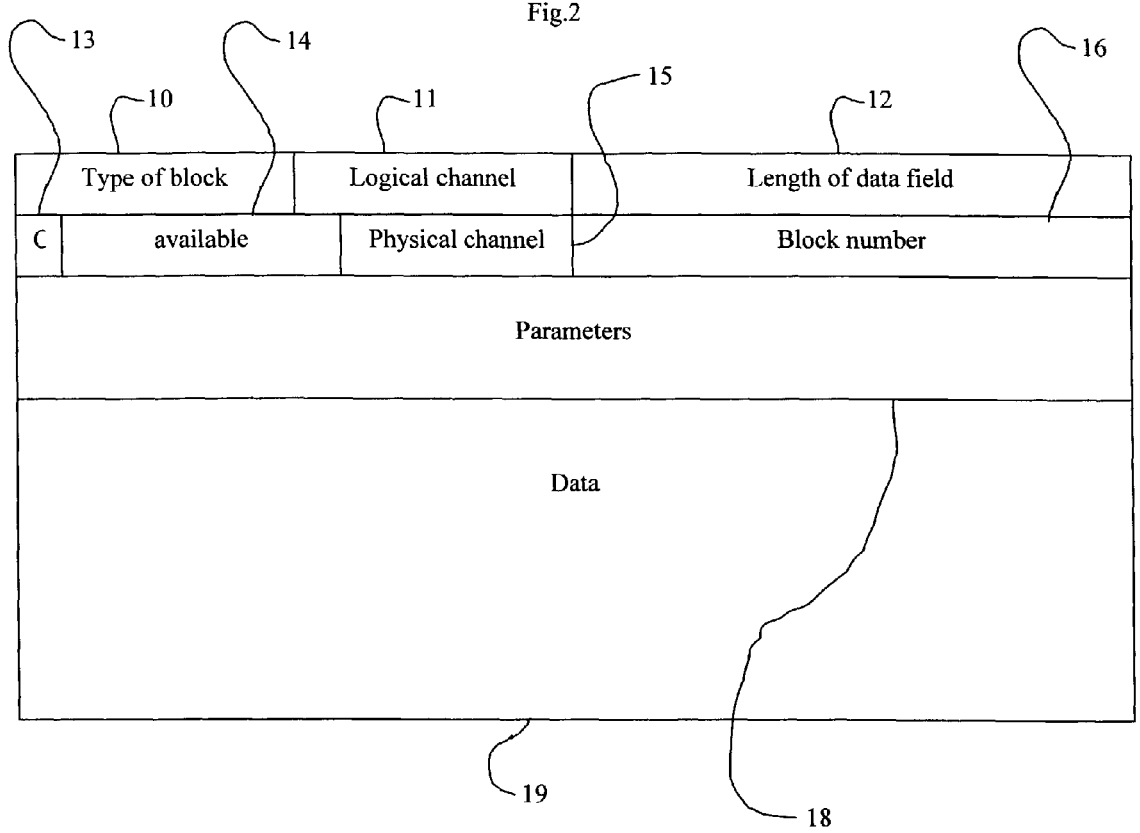
FIG. 2 presents a format of a block according to the invention.

Referring to FIG. 2, each block is constituted by a header and a data field 19.

The header includes a field 10 for identifying a type to which the block belongs, a field 11 for identifying a logical channel for conveying the block, a field 12 for indicating a length of the data field 19, a field 13 for indicating whether the block is the last one conveyed through the identified logical channel, a field 15 for identifying a physical channel through which the block is to be sent, a field 16 for indicating the number of the block, and a field 18 for containing parameters that may be used in processing the block. The header can also include one or more available fields 14 for possible later use.

In the exemplary embodiment considered as a nonlimiting example, the fields 10 and 11 are eight bits long, the fields 12 and 16 are sixteen bits long, the field 13 is one bit long, the field 14 is nine bits long, the field 15 is six bits long and the field 18 is sixty four bits long.

The field 19 has a variable length given by the value of the field 12.

Figure 3:
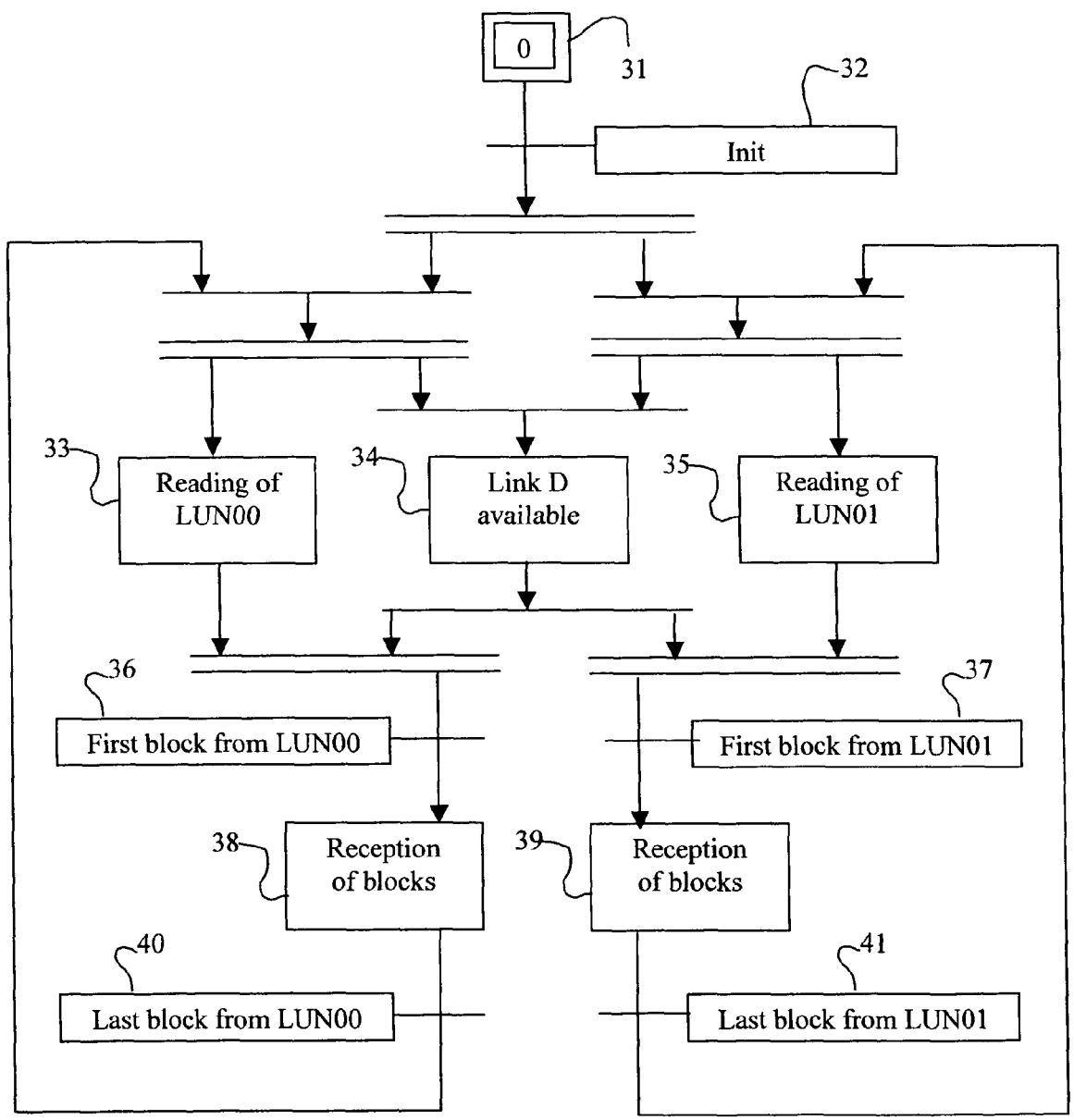
FIG. 3 presents a state diagram of the satellite system for a downlink.
Figure 4:
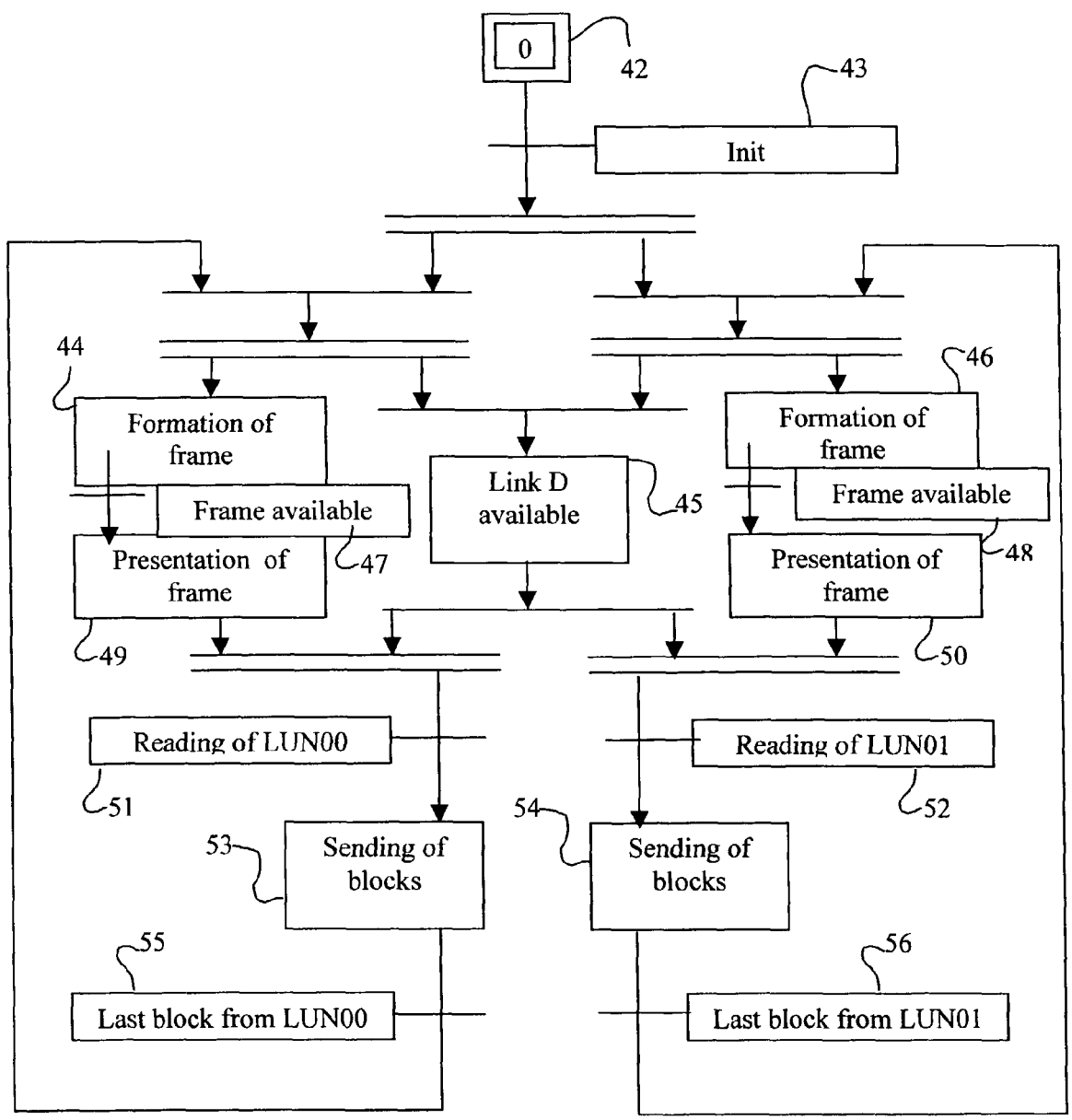
FIG. 4 presents a state diagram of the central system for the downlink.

The defined block types are the following:
  data block transmitted from the central system to the satellite system;
  data block transmitted from the satellite system to the central system;
  terminal status block;
  special status block;
  service block transmitted from the central system to the satellite system;
  service block transmitted from the satellite system to the central system;

Referring to FIG. 3, a state diagram of the satellite system 30, and to FIG. 4, a state diagram of the central system 1, each of them describes steps that may be used to implement an exchange protocol in the link 17 according to the invention.

General conventions for reading these diagrams will be used in the description below. They indicate steps 31, 35, 39 such that the passage from one step to the next is symbolized by one or more arrows, wherein an arrow between two steps is interrupted by a perpendicular line that indicates a condition 32, 37, 41 for transition to a subsequent step.

The logical state of the upstream end of an arrow is identical to the logical state of a step from which it is derived or to a logical combination of the downstream states of arrows that precede it. These logical combinations are represented by single or double horizontal lines at which one or more arrows end and from which they begin again.

A single horizontal line indicates that a disjunction (OR) of logical states of one or more arrows that end at this line has the same value as a logical disjunction of one or more arrows that start from this line.

A double horizontal line indicates that a conjunction (AND) of logical states of one or more arrows that end at this line has the same value as a logical conjunction of one or more arrows that start from this line.

In the absence of any perpendicular line that interrupts an arrow to indicate a transition, a low or high logical state of the downstream arrow is identical to an upstream logical state of the arrow.

In the presence of a perpendicular line that interrupts an arrow to indicate a transition, the downstream logical state of the arrow is equal to a logical conjunction of the upstream logical state of the arrow and the logical state of the transition indicated. A switch from the low logical state to the high logical state of the downstream end of an arrow interrupted by a transition has the effect of switching the upstream end of the arrow from the high logical state to the low logical state.

Applying the conventions explained above to FIG. 3, the satellite system 30, initially in the high logical state in a reference step 31, is started by setting an initialization transition 32 to the high state. This has the effect of deactivating the step 31 by setting it to the low logical state and activating steps 33 and 34 by setting them to the high logical state.

Step 34 declares the link D available for a transfer of blocks from the control card 9 to the coupler 21.

Step 33 sends a read command through the link D to a logical unit number LUN00. Thus, the satellite system 30 sees the central system 1 as a storage unit, such as for example a magnetic tape, with the logical unit number LUN00.

A response from the control card 9 to the read command results in a frame transfer through the link 17 to the coupler 21. The first block of the frame coming from the logical unit with the number LUN00 sets a transition 36 to the high state.

The high states of the steps 33 and 34 with the high state of the transition 36 activate a step 38 by setting it to the high state and deactivate the steps 33 and 34 by setting them to the low state. Step 38 is the step for the reception of the blocks by the coupler 21. The last block of the frame coming from the logical unit with the number LUN00 sets a transition 40 to the high state.

The high states of the step 38 and the transition 40 reactivate the steps 33 and 34 by setting them to the high state and deactivate the step 38 by setting it to the low state.

In order to improve the performance of the link 17, the setting of the transition 32 to the high state has the additional effect of setting a step 35 to the high state.

Step 35 sends a read command through the link D to a logical unit number LUN01. Thus, the satellite system 30 also sees the central system 1 as a storage unit, such as for example a magnetic tape, with the logical unit number LUN01.

A response from the control card 9 to the read command results in a frame transfer through the link 17 to the coupler 21. The first block of the frame coming from the logical unit with the number LUN01 sets a transition 37 to the high state.

The high states of the steps 34 and 35 with the high state of the transition 37 activate a step 39 by setting it to the high state and deactivate the steps 34 and 35 by setting them to the low state. Step 39 is the step for the reception of the blocks by the coupler 21. The last block of the frame coming from the logical unit with the number LUN01 sets a transition 41 to the high state.

The high states of the step 39 and the transition 41 reactivate the steps 34 and 35 by setting them to the high state and deactivate the step 39 by setting it to the low state.

The simultaneous activation of the steps 33 and 35 at the start makes it possible to optimize the transfers through the link 17 by sending a second read command without having to wait for the response to the first read command. Upon reception of the last block coming from LUN00 or LUN01, the transition 40, or respectively 41, reactivates the steps 33 and 34, or respectively 34 and 35. The possible states of the link 17 for the satellite system 30 are therefore:
  steps 33, 34 and 35 active, waiting for responses to two read commands;
  steps 33 and 39 active, waiting for a response to the read command in LUN00 and receiving a response in LUN01;
  steps 35 and 38 active, waiting for a response to the read command in LUN01 and receiving a response in LUN00;

Applying the conventions explained above to FIG. 4, the central system 1, initially in the high logical state in a reference step 42, is started by setting an initialization transition 43 to the high state. This has the effect of deactivating the step 42 by setting it to the low logical state and activating the steps 44 and 45 by setting them to the high logical state.

Step 45 sets the control card 9 in a wait state for a command via the link 17, thus determining a slave operating mode in the link 17.

Step 44 consists of forming a frame that will be transmitted to the satellite system 30 in response to a read command through the coupler 21. When the central system 1 activates an operation for accessing a peripheral subsystem 2, 3, 4, 5, the processor 6 sends the control card 9, via the bus 8, a load command for a read access or a store command for a write access. Upon reception of a load or store command, the control card 9 generates one or more blocks in the model of the one presented in FIG. 2.

For a load or store command, the control card 9 enters into the field 10 a value that indicates that the block type is a data block transmitted from the central system to the satellite system, into the field 11 a value that indicates a logical channel number common to all the blocks created for the same access operation, in the field 12 a value that indicates the length of the field 19, in the field 15 a value that indicates the peripheral subsystem involved in the access operation, and in the field 18 the parameters necessary to the access operation such as a control word specifying an encoding of the data of the field 19, flags for handling suspensions and statuses for handling errors.

When the access operation involves a load command, the control card 9 enters into the field 19 control data for specifying the load instructions with the start and end addresses of the data to be loaded, coming from the peripheral subsystem in question.

When the access operation involves a store command, the control card 9 enters into the field 19 of a first block control data for specifying the store instructions with the start and end addresses of the data to be stored in the peripheral subsystem in question. The control card 9 removes one bit from the field 13 of the first block and from the field 13 of each block that precedes a subsequent block, then increments the field 16 of the next block. The bit of the field 13 is lowered for the last block of the access operation. This makes it possible to enter into the field 19 of the subsequent blocks the data to be stored in the peripheral subsystem involved in the access operation.

The control card 9 also generates service blocks for the management of the link 17, tests, activity monitoring, flow control, and for maintenance and error reporting operations. The control card 9 then specifies in the field 10 that this block is a service block. Such a block may be constituted by a simple header without a field 19. The field 19 then contains the management or maintenance parameters.

The blocks generated by the control card 9 are placed in a state for waiting to be transmitted through the link 17.

Setting the step 44 to the high state triggers two actions. A first action scans the waiting blocks. A second action removes a timeout in the case where no block is waiting to be transmitted. If no block is waiting at the end of the timeout, the control card 9 creates an empty block, i.e. a block that is constituted by a simple header without a field 19 and that leaves its type empty in the field 10. This makes it possible to transmit a response to the read order coming from the coupler 21, so as not to detect any false errors in the link 17 in the absence of blocks to be transmitted. The control card 9 then collects, in a frame whose length is compatible with the flow control, the blocks of the same type, and for data blocks, those of the same access operation.

A transition 47 is in the high state soon as a frame is available. The transition 47 resets the step 44 to the low state and sets a step 49 to the high state. Step 49 presents the previously created frame to the logical unit LUN00.

A transition 51 is in the high state if the control card 9 has received a read command through the link 17 for the logical unit LUN00. The conjunction of the high states of the steps 45, 49 and the high state of the transition 51 activates a step 53 by setting it to the high state and resets the steps 45 and 49 to the low state.

In step 53, the blocks of the frame presented in the logical unit LUN00 are sent through the link 17 to the coupler 21.

The last block of the frame sent sets a transition 55 to the high state. The conjunction of the high states of the step 53 and the transition 55 resets the step 53 to the low state and reactivates the steps 44 and 45 by setting them to the high state. This makes it possible to send other blocks, for example for other access operations or for the continuation of the same access operation.

In addition to the transition 32 and the step 35 for taking advantage of the transfer capacities of the link 17, the conjunction of the high logical states of the reference step 42 and the initialization step 43 also activates a step 46 by setting it to the high logical state.

As with the step 44, setting the step 46 to the high state triggers two actions. A first action scans the waiting blocks. A second action removes a timeout in the case where no block is waiting to be transmitted. If no block is waiting at the end of the timeout, the control card 9 creates an empty block, i.e. a block that is constituted by a simple header without a field 19 and that leaves its type empty in the field 10. This makes it possible to transmit a response to the read order coming from the coupler 21, so as not to detect any false errors in the link 17 in the absence of blocks to be transmitted. The control card 9 then collects, in a frame whose length is compatible with the flow control, the blocks of the same type, and for data blocks, those of the same access operation.

A transition 48 is in the high state soon as a frame is available. The transition 48 resets the step 46 to the low state and sets a step 50 to the high state. Step 50 presents the previously created frame to the logical unit LUN01.

A transition 52 is in the high state if the control card 9 has received a read command through the link 17 for the logical unit LUN01. The conjunction of the high states of the steps 45, 50 and the high state of the transition 52 activates a step 54 by setting it to the high state and resets the steps 45 and 50 to the low state.

In step 54, the blocks of the frame presented in the logical unit LUN01 are sent through the link 17 to the coupler 21.

The last block of the frame sent sets a transition 56 to the high state. The conjunction of the high states of the step 54 and the transition 56 resets the step 53 to the low state and reactivates the steps 46 and 45 by setting them to the high state. This makes it possible to send other blocks, for example for other access operations or for the continuation of the same access operation.

The possible states of the link 17 for the central system I are therefore:
- steps 44, 45 and 46 active, waiting for frames to transmit;
- steps 44, 45 and 50 active waiting for a frame for LUN00 and waiting for a read operation for LUN01;
- steps 49, 45 and 46 active, waiting for a read operation for LUN00 and waiting for a frame for LUN01;
- steps 49, 45 and 50 active, waiting for a read operation for LUN00 and for LUN01;
- steps 53 and 46 or 50 active, waiting for the end of a transmission from LUN00;
- steps 54 and 44 or 49 active, waiting for the end of a transmission from LUN01.

Figure 5:
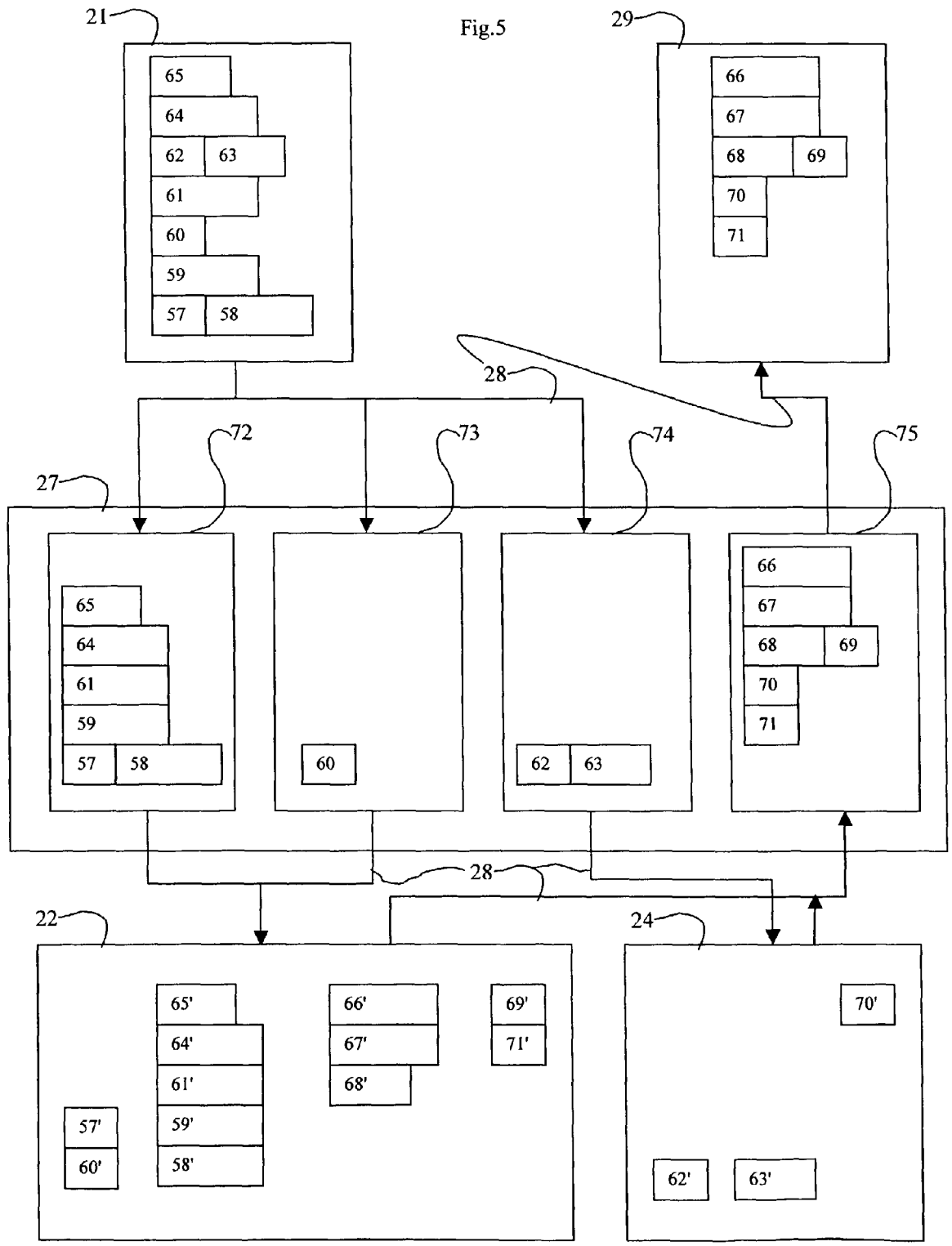
FIG. 5 presents a diagram of block processing in the satellite system.

Referring to FIG. 5, the frames received in the coupler 21 in steps 38 and 39 are processed by the satellite system 30 in the following way:

Upon receiving a block in accordance with the protocol explained in reference to the preceding figures, the satellite system 30 stores this block in an incoming buffer 72, 73, 74 corresponding to the logical channel contained in the field 11;

Upon receiving the last block from the same logical channel, the satellite system 30 sends the content of the buffer 72, 73, 74 to the coupler 22, 23, 24, 25 corresponding to the physical channel contained in the field 15, adapting the commands to this coupler.

The coupler 22, 23, 24 25 returns a response stored in an outgoing buffer 75.

The satellite system 30 transmits the content of the buffer 75 to the coupler 29 in the sequence of the protocol explained in reference to the following figures.

For example, in step 38, the coupler 21 receives a frame comprising the blocks 57, 58. The field 11 of these blocks identifies a logical channel corresponding to the buffer 72 contained in memory 27. The satellite system 30 stores the blocks of the frame in the buffer 72 via the bus 28. The field 13 of the block 58 indicates that there are other blocks to follow for the same logical channel.

In step 39, the coupler 21 receives a frame comprising a block 59. The field 11 of this block identifies a logical channel corresponding to the buffer 72 contained in memory 27. The satellite system 30 stores the block of the frame in the buffer 72 via the bus 28. The field 13 of the block 59 indicates that there are other blocks to follow for the same logical channel.

In step 39, the coupler 21 receives a frame comprising a block 60. The field 11 of this block identifies a logical channel corresponding to the buffer 73 contained in memory 27. The satellite system 30 stores the block of the frame in the buffer 73 via the bus 28. The field 13 of the block 60 indicates that it is the last block from this logical channel.

The field 19 of the block 60 contains load commands. The satellite system 30 creates a control block 60' from the field 19. The field 15 of the block 60 identifies a physical channel corresponding to the coupler 22. The satellite system 30 transmits the block 60' to the coupler 22 via the bus 28.

In step 38, the coupler 21 receives a frame comprising a block 61. The field 11 of this block identifies a logical channel corresponding to the buffer 72 contained in memory 27. The satellite system 30 stores the block of the frame in the buffer 72 via the bus 28. The field 13 of the block 61 indicates that it precedes another block from the same logical channel.

In step 39, the coupler 21 receives a frame comprising blocks 62, 63. The field 11 of these blocks identifies a logical channel corresponding to the buffer 74 contained in memory 27. The satellite system 30 stores the block of the frame in the buffer 74 via the bus 28. The field 13 of the block 63 indicates that there is no other block to follow for the same logical channel.

The field 19 of the block 62 contains store commands. The satellite system 30 creates a control block 62' from the field 19. The field 15 of the block 62 identifies a physical channel corresponding to the coupler 24. The satellite system 30 transmits the block 62' to a control part of the coupler 24 and the content of the field 19 of the block 63 to a data part of the coupler 24, via the bus 28, in the form of a block 63'.

In step 38, the coupler 21 receives a frame comprising a block 64. The field 11 of this block identifies a logical channel corresponding to the buffer 72 contained in memory 27. The satellite system 30 stores the block of the frame in the buffer 72 via the bus 28. The field 13 of the block 64 indicates that it precedes another block from the same logical channel.

In step 39, the coupler 21 receives a frame comprising a block 65. The field 11 of this block identifies a logical channel corresponding to the buffer 72 contained in memory 27. The satellite system 30 stores the block of the frame in the buffer 72 via the bus 28. The field 13 of the block 65 indicates that there is no other block to follow for the same logical channel.

The field 19 of the block 57 contains store commands. The satellite system 30 creates a control block 57' from the field 19. The field 15 of the block 57 identifies a physical channel corresponding to the coupler 22. The satellite system 30 transmits the block 57' to a control part of the coupler 22 and the content of the field 19 of the blocks 58, 59, 61, 64, 65 to a data part of the coupler 22 in the form of blocks 58', 59', 61', 64', 65', via the bus 28.

The coupler 22 executes, in the peripheral subsystem 2, the load command specified by the block 60'. The peripheral subsystem then returns data blocks 66', 67', 68' and a status block 69' to the coupler 22. The satellite system 30 then places each block 66', 67', 68', 69' in the field 19 of a block 66, 67, 68, 69 in accordance with the protocol described previously. In particular, the field 10 indicates that the block type is a data block transmitted from the satellite system to the central system, the field 11 identifies the same logical channel as the field 11 of the block 60. The field 13 of each of the blocks 66, 67, 68 indicates that the block precedes another block from the same logical channel. The field 13 of the block 69 indicates that the block does not precede any other block from the same logical channel. The satellite system 30 stores the blocks 66, 67, 68, 69 in the buffer 75 via the bus 28.

The coupler 24 executes, in the peripheral subsystem 4, the store command specified by the block 62'. The peripheral subsystem then returns a status block 70' to the coupler 24. The satellite system 30 then places the block 70' in the field 19 of a block 70 in accordance with the protocol described previously. In particular, the field 10 indicates that the block type is a data block transmitted from the satellite system to the central system, and the field 11 identifies the same logical channel as the field 11 of the block 62. The field 13 of each of the block 70 indicates that the block does not precede any other block from the same logical channel. The satellite system 30 stores the block 70 in the buffer 75 via the bus 28.

The coupler 22 executes, in the peripheral subsystem 2, the store command specified by the block 57'. The peripheral subsystem then returns a status block 71' to the coupler 22. The satellite system 30 then places the block 71' in the field 19 of a block 71 in accordance with the protocol described previously. In particular, the field 10 indicates that the block type is a data block transmitted from the satellite system to the central system, and the field 11 identifies the same logical channel as the field 11 of the block 57. The field 13 of the block 71 indicates that the block does not precede any other block from the same logical channel. The satellite system 30 stores the block 71 in the buffer 75 via the bus 28.

Figure 6:
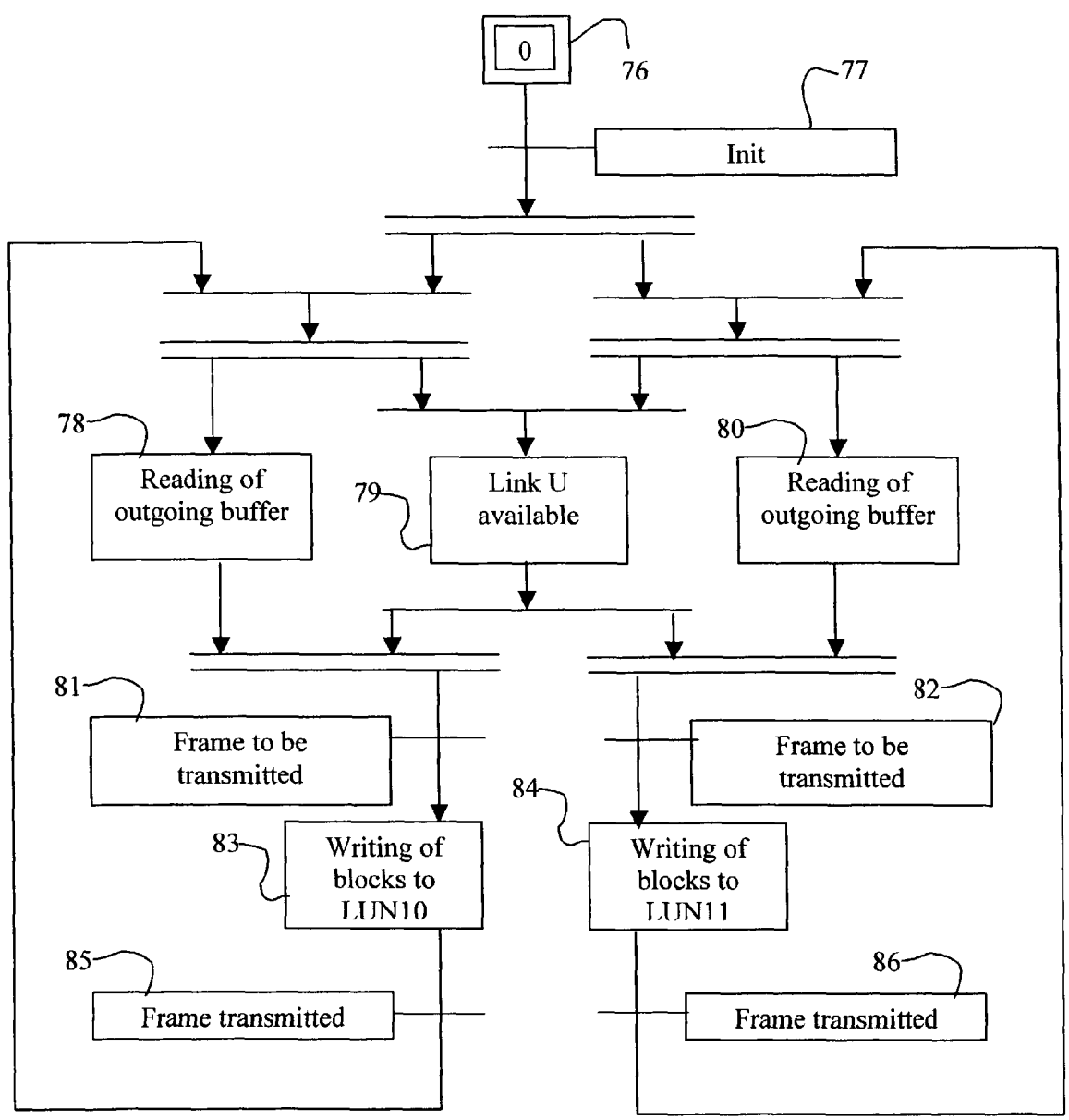
FIG. 6 presents a state diagram of the satellite system for an uplink.

The frames contained in the buffer 75 are sent through the link 20 by means of the coupler 29, in accordance with the state diagram of FIG. 6.

Applying the conventions explained above to FIG. 6, the satellite system 30, initially in the high logical state in a reference step 76, is started by setting an initialization transition 77 to the high state. This has the effect of deactivating the step 76 by setting it to the low logical state and activating the steps 78 and 79 by setting them to the high logical state.

Step 79 declares the link U available for a transfer of blocks from the card of the coupler 29 to the control card 9.

Step 78 reads the outgoing buffer 75 in order to detect whether a frame is ready to be transmitted to a logical unit number LUN10. Thus, the satellite system 30 sees the central system 1 as a storage unit, such as for example a magnetic tape, with the logical unit number LUN10.

The detection of a frame in the buffer 75 that the step 78 decides to send to the logical unit with the number LUN10, sets a transition 81 to the high state.

The high states of the steps 78 and 79, with the high state of the transition 81, activate a step 83 by setting it to the high state and deactivate the steps 78 and 79 by setting them to the low state. Step 83 sends through the link 20 a write command to the logical unit LUN10 and the blocks of the frame to be transmitted. The last block of the frame transmitted to the logical unit with the number LUN10 sets a transition 85 to the high state.

The high states of the step 83 and of the transition 85 reactivate the steps 78 and 79 by setting them to the high state and deactivate the step 83 by setting it to the low state.

In a way that improves the performance of the link 20, setting the transition 77 to the high state has the additional effect of setting a step 80 to the high state.

Step 80 reads the outgoing buffer 75 in order to detect whether a frame is ready to be transmitted to a logical unit number LUN11. Thus, the satellite system 30 sees the central system 1 as a storage unit, such as for example a magnetic tape, with the logical unit number LUN11.

The detection of a frame in the buffer 75 that the step 80 decides to send to the logical unit with the number LUN11, sets a transition 82 to the high state.

The high states of the steps 80 and 79 with the high state of the transition 82 activate a step 84 by setting it to the high state and deactivate the steps 80 and 79 by setting them to the low state. Step 84 sends through the link 20 a write command to the logical unit LUN11 and the blocks of the frame to be transmitted. The last block of the frame transmitted to the logical unit with the number LUN11 sets a transition 86 to the high state.

The high states of the step 84 and the transition 86 reactivate the steps 80 and 79 by setting them to the high state and deactivate the step 84 by setting it to the low state.

The simultaneous activation of the steps 78 and 80 at the start makes it possible to optimize the transfers through the link 20 by rereading the buffer 75 without having to wait for the end of execution of the first read command. Upon the transmission of the last block to be written to LUN10 or LUN11, the transition 85, or respectively 86, reactivates the steps 78 and 79, or respectively 79 and 80. The possible states of the link 20 for the satellite system 30 are therefore:

steps 78, 79 and 80 active, waiting for frames in the buffer 75;

steps 78 and 84 active, waiting for the end of a write operation in LUN11;

steps 80 and 83 active, waiting for the end of a write operation in LUN10;

Returning to the example of FIG. 4, the reading of the buffer 75 in step 78 detects a frame constituted by the data block 66. A write command LUN10 and the block 66 are sent in step 83.

The reading of the buffer 75 in step 80 detects a frame constituted by the data block 67. After the transmission of the block 66, the steps 79 and 78 are reactivated. A write command LUN11 and the block 67 are sent in step 84. The reading of the buffer 75 in step 78 detects a frame constituted by data blocks 68 and 69. After the transmission of the block 67, the steps 79 and 80 are reactivated. A write command LUN10 and the blocks 68 and 69 are sent in step 83. The reading of the buffer 75 in step 80 detects a frame constituted by the data block 70. After the transmission of the blocks 68 and 69, the steps 79 and 78 are reactivated. A write command LUN11 and the block 70 are sent in step 84.

When the control card 9 has received the blocks 66 through 69 wherein the field 11 indicates the same logical channel as the field 11 of the block 60, it provides through the bus 8 a response to the load command it had sent in the field 19 of the block 60. The response is constituted by the content of the fields 19 of the blocks 66 through 68, loaded into memory 7. The control card 9 also sends through the bus 8 the content of the field 19 of the block 69 in order to indicate to the central system 1 that the load operation is finished.

When the control card 9 has received the block 70 wherein the field 11 indicates the same logical channel as the field 11 of the block 62, it provides through the bus 8 a response to the store command it had sent in the field 19 of the block 62. The response is constituted by the content of the field 19 of the block 70, so as to indicate to the central system 1 that the store operation is finished.

One skilled in the art can easily understand from the preceding description that the operations of the central system are not limited to operations for accessing storage units. The teaching of the invention can advantageously be extended to communication operations in networks like the Internet, for example by replacing the coupler 25 with a network access card.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein and defined in the claims.

We claim:

1. A method for exchanging information between a central system and a satellite system, which executes at least one operation of the central system, said method comprising:
    a first step which includes sending a read command identified by a first logical unit number from the satellite system to the central system;
    a second step which includes sending from said central system a first data block containing said operation in response to said read command, wherein said first data block includes an operation control block and a corresponding operation data block each associated with said operation, wherein said first data block includes a first field containing commands or data of said operation; and a header containing a second field for identifying a logical channel corresponding to said operation and a third field for indicating a length of the first field;
    a third step which includes receiving said first data block in the satellite system in order to process said operation, said second step and said third step being performed concomitantly;
    transmitting, by said satellite system, said operation control block to a control portion of a peripheral coupler of the satellite system; and
    transmitting, by said satellite system, said operation data block to a data portion of the peripheral coupler of the satellite system; and
    a fourth step which includes sending a write command from the satellite system to the central system identified by a second logical unit number and a second data block resulting from said operation,
    wherein said operation control block and said operation data block are used by said satellite system to execute said operation using a peripheral subsystem operably coupled to said satellite system via said peripheral coupler, wherein said first step is performed using a first directional link, wherein said second step is performed using said first directional link, wherein said fourth step is performed using a second directional link having a different coupler from said first directional link, wherein said satellite system is master for the first and second directional links, wherein said first directional link is a downlink from said satellite system to said central system, and wherein said second directional link is an uplink from said satellite system to said central system.

2. The method according to claim 1, further comprising:

sending a read command identified by a third logical unit number from the satellite system to the central system;

sending from the central system, in response to said read command, a third data block containing said operation; and receiving, in the satellite system, said third data block in order to process the operation in said third data block, said receiving of said third data block seventh step and said second step being performed concomitantly.

3. The method according to claim 2, further comprising:

sending a write command identified by a fourth logical unit number from the satellite system to the central system and a fourth data block resulting from said operation.

* * * * *

UNITED STATES PATENT AND TRADEMARK OFFICE
CERTIFICATE OF CORRECTION

| | | |
|---|---|---|
| PATENT NO. | : 7,873,662 B2 | |
| APPLICATION NO. | : 10/088224 | |
| DATED | : January 18, 2011 | |
| INVENTOR(S) | : Denis Pinson, Patrick Sala and Jean-Paul Pigache | |

It is certified that error appears in the above-identified patent and that said Letters Patent is hereby corrected as shown below:

Column 12 – Line 9, delete "seventh step".

Signed and Sealed this

Nineteenth Day of April, 2011

David J. Kappos
*Director of the United States Patent and Trademark Office*